Patented Mar. 17, 1936

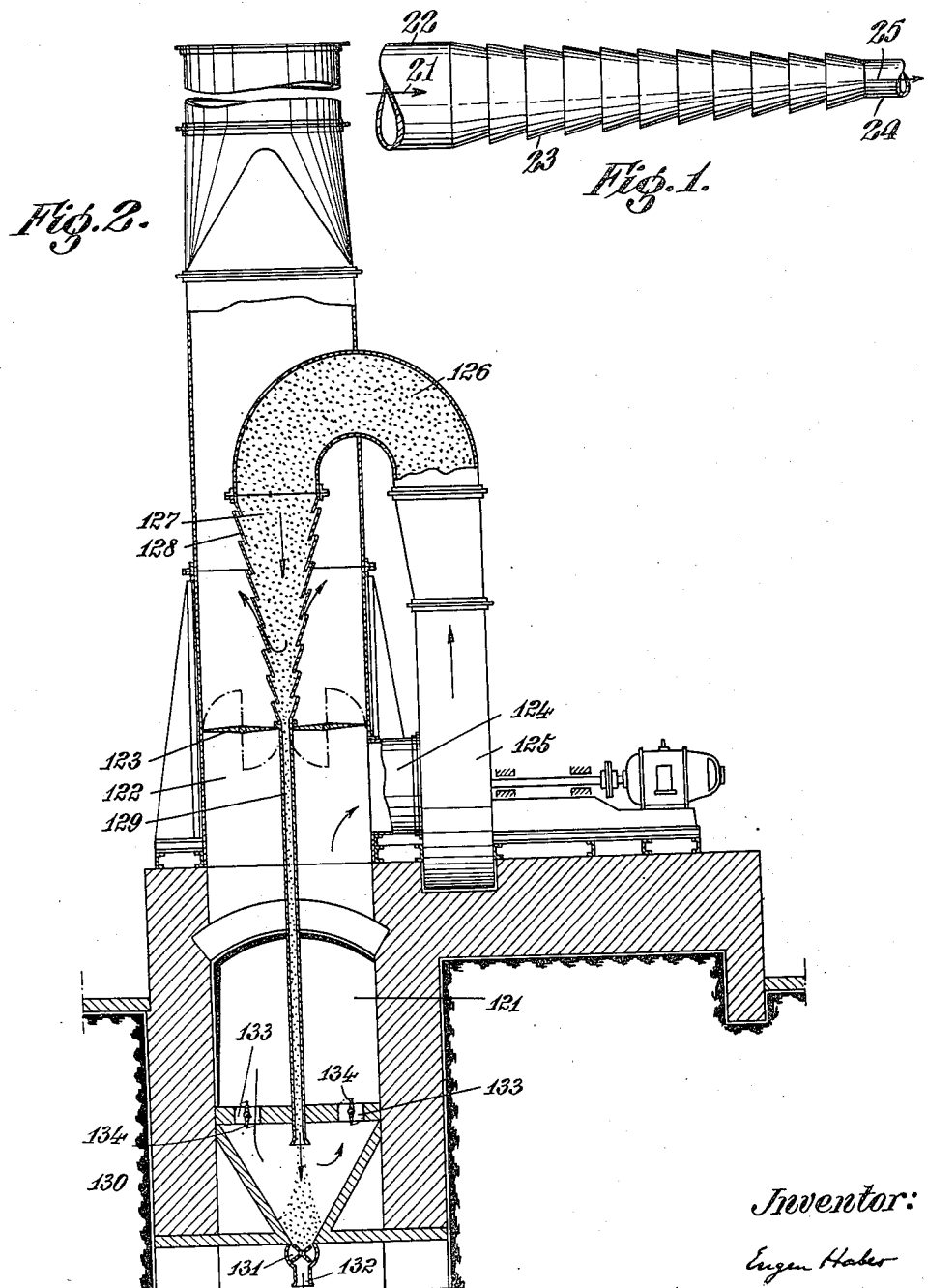

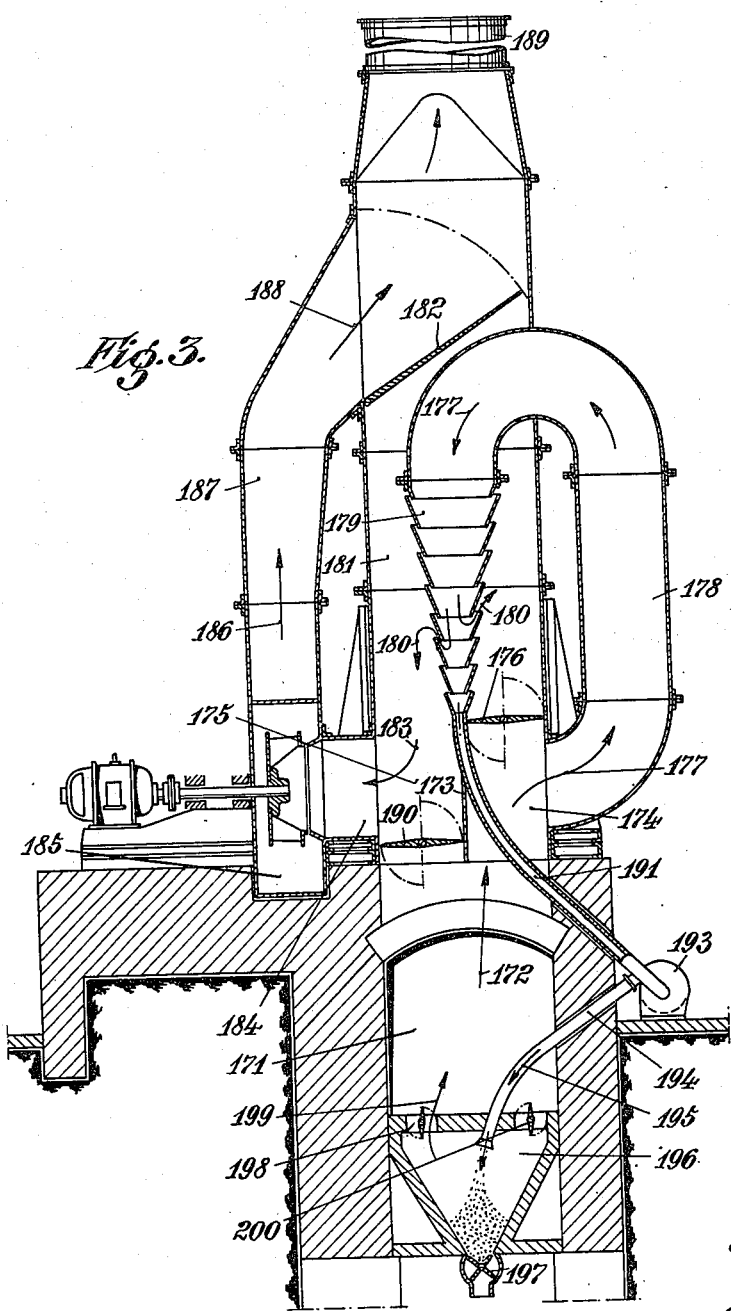

2,034,467

UNITED STATES PATENT OFFICE 2,034,467

APPARATUS FOR REMOVING OF SOLID OR LIQUID PARTICLES FROM GASES OR VAPORS

Eugen Haber, Berlin, Germany

Application June 6, 1932, Serial No. 615,663
In Germany June 12, 1931

2 Claims. (Cl. 183—75)

This invention relates to an arrangement for removing solid or liquid particles from gases or steam, which divides the gases or steam into two part flows, namely a large flow, which is completely or partly freed from the foreign bodies contained in the medium and a small flow, the contents of foreign bodies of which is enriched by a corresponding amount. Such arrangements have for their object, to concentrate the solid or liquid particles contained in the gases in a relatively small gas or steam quantity. The final removing of the solid or liquid particles from this small quantity of the gases or steam can then be effected in separating devices, which can be of small dimensions corresponding to the quantity of the medium.

Several of the embodiments of the invention are illustrated by way of example in the accompanying drawings, in which:

Fig. 1 shows in side elevation a form of construction of the separating unit,

Fig. 2 is a part longitudinal section showing an induced draught plant with arrangement for removing flue dust, and Fig. 3 is a part longitudinal section showing an induced draught plant with arrangements for removing flue dust on the suction side of the blower.

The separating device shown in Fig. 1 comprises sleeves 23 that are successively of smaller size towards the end of the separator. The medium to be cleansed is supplied in the direction of the arrow 21 through a conduit 22 into a sleeve element composed of a plurality of said sleeves 23 of successively decreasing size towards the end of the separator. A conduit 24 extends from the last sleeve, through which conduit the remaining quantity of medium enriched in foreign bodies is lead off in the direction of the arrow 25. The cleansed gases in this separating device pass out through the slots between the sleeves 23.

Fig. 2 shows an induced draught plant with arrangement for separating flue dust from flue gases. The flue gases flow from the main flue 121 into the lower portion of the chimney 122 which is shut off from the upper portion of the chimney by registers 123. The flue gases are sucked from this point by a blower 125 through a pipe 124 and forced into an elbow 126, which conducts the flue gases into a separator 127, which consists of a set of conical sleeves 128 placed one in the other. The purified flue gases flow between these sleeves into the chimney, whereas a remaining quantity enriched with flue dust and coke dust is conducted through a conduit 129 extending from the separator into a settling chamber 130. In this chamber 130 the dust carried along by the gases settles and is discharged through the mouth 132 of the chamber with the aid of a discharging device 131. In the roof of the chamber 130 apertures 133 are provided through which the chamber communicates with the main flue 121. Rotatable registers 134 are arranged in these apertures. The gases, liberated after depositing the dust in the chamber 130, return into the conduit for the freshly arriving polluted, gases in order to again be fed therewith to the separator. The vertical arrangement of the separator according to Fig. 2 presents the advantage that the particles of ash contained in the flue gases settle by gravity in the bottom end of the separator. A considerable speed is imparted to the flue gases by the blower 125, whereby the separating effect in the separator is improved.

Fig. 3 shows an induced draught plant with arrangement for removing the flue dust, wherein the separator is arranged on the suction side of the blower. In this instance, the flue gases flow from the main flue 171, into the lower portion of the chimney in the direction of the arrow 172. This chimney is subdivided into two compartments 174 and 175 by a partition 173. The gases flowing out from the main flue 171 first arrive in the chamber 174, which is closed at the top by an oscillatable register 176. From this compartment the flue gases flow in the direction of the arrow 177 into the conduit 178 connected thereto and thence into the vertical separator 179. This separator is again composed of a set of conical sleeves placed one in the other with clearance. The cleansed gases flow through the slots between the sleeves in the direction of the arrow 180 into the chimney portion 181. When the separator is operated, this portion of the chimney is closed at the top by an oscillatable register 182. From this space 181 the cleansed flue gases are drawn through the compartment 175 in the direction of the arrow 183 into a pipe connection 184 by means of a blower 185. The blower forces the cleansed flue gases in the direction of the arrow 186 into a conduit 187 and thence into the upper portion 189 of the chimney in the direction of the arrow 188. When the separator is operated, the compartment 175 in the lower end of the chimney is closed at the bottom by an oscillatable register 190. A quantity of flue gas containing a large percentage of dust passes from the lower end of the separator into a conduit 191 connected thereto and is drawn therefrom in the direction of the arrow 192 by means of a blower 193. The blower 193 forces the quantity of flue gas containing a large percentage of dust through a conduit 194 into a chamber 196 in the direction of the arrow 195. The dust settles in this chamber 196 and is drawn off by means of a drawing-off or discharging device 197. The quantity of flue gas liberated during the settling of the dust flows from the upper portion of the chamber through apertures 198 in the roof of the chamber and returns into the main flue 171 in the direction of the arrow 199. The apertures 198 are regulated by adjustable registers 200. By mutually regulating the running speeds of the blowers 185 and 193 the desired proportion between the quantities of gas divided in the separator can be attained. The quantity of cleansed gas passing out between the cones of the separator will be the greater the higher the revolving speed of the blower 185 is and the lower the revolving speed of the blower 193 is and inversely.

It is believed in view of the foregoing that a further detailed description of the invention is unnecessary. Likewise it is believed that the advantages of the invention have been fully set forth.

Having thus fully described the invention what is claimed as new and desired to be secured by Letters Patent is:

1. An arrangement for removing solid and liquid particles from gases by means of a conduit tapering toward its end and provided with wall apertures, said conduit composed of a set of conical sleeves inserted one in the other with clearance between the individual sleeves, said sleeves being of gradually smaller diameter towards the end of the conduit, and adapted to deflect the main portion of the gas in cleansed condition through the apertures and to deliver from the end of the conduit the remaining portion of gas enriched with the impurities from the cleansed portion, a supply conduit adapted to convey the medium to be cleansed to said tapering conduit, an intermediate conduit extending from the narrow end of said tapering conduit, a settling chamber at the other end of said intermediate conduit communicating with said supply conduit and registers in the roof of said settling chamber adapted to shut off said settling chamber.

2. An arrangement for removing solid and liquid particles from gases by means of a conduit tapering toward its end and provided with wall apertures, said conduit composed of a set of conical sleeves inserted one in the other with clearance between the individual sleeves, said sleeves being of gradually smaller diameter towards the end of the conduit, and adapted to deflect the main portion of the gas in cleansed condition through the apertures and to deliver from the end of the conduit the remaining portion of gas enriched with the impurities from the cleansed portion, a blower with its suction side towards said tapering conduit, a connecting conduit extending from the narrow end of said tapering conduit and a second blower connected at its suction side to said connecting conduit adapted to draw off the portion of the medium enriched with impurities.

EUGEN HABER.